(12) United States Patent
Bloom et al.

(10) Patent No.: US 10,733,762 B2
(45) Date of Patent: Aug. 4, 2020

(54) DYNAMICALLY CALIBRATING A DEPTH SENSOR

(71) Applicant: MOTOROLA MOBILITY LLC, Chicago, IL (US)

(72) Inventors: Daniel M. Bloom, Loveland, CO (US); Yinhu Chen, Deerfield, IL (US); Weihua Sun, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 246 days.

(21) Appl. No.: 15/944,959

(22) Filed: Apr. 4, 2018

(65) Prior Publication Data

US 2019/0311496 A1    Oct. 10, 2019

(51) Int. Cl.
*G06K 9/00* (2006.01)
*G06T 7/80* (2017.01)
*G06T 7/521* (2017.01)

(52) U.S. Cl.
CPC .............. *G06T 7/85* (2017.01); *G06T 7/521* (2017.01); *G06T 2207/10024* (2013.01); *G06T 2207/10028* (2013.01); *G06T 2207/10048* (2013.01)

(58) Field of Classification Search
CPC ........... G06T 2207/10028; G06T 7/593; G01L 27/002; G01S 11/12; G01V 13/00
USPC ........................................................ 382/154
See application file for complete search history.

(56) References Cited

U.S. PATENT DOCUMENTS 9,761,015 B2 *   9/2017   Xiao .................. G06K 9/00

OTHER PUBLICATIONS

Pandey, Gaurav, et al., "Automatic Targetless Extrinsic Calibration of a 3D Lidar and Camera by Maximizing Mutual Information", Proceedings of the Twenty-Sixth AAAI Conference on Artificial Intelligence, pp. 2053-2059, 2012.
Miller, Stephen, et al., "Unsupervised extrinsic calibration of depth sensors in dynamic scenes", IEEE/RSJ International Conference on Intelligent Robots and Systems (IROS), pp. 2695-2702, Nov. 3-7, 2013.
Zeisl, Bernhard et al., "Structure-Based Auto-Calibration of RGB-D Sensors", 2016 IEEE International Conference on Robotics and Automation (ICRA), pp. 5076-5083, May 16-21, 2016.

* cited by examiner

*Primary Examiner* — Charlotte M Baker
(74) *Attorney, Agent, or Firm* — Yudell Isidore PLLC (57) ABSTRACT

A method, a system, and a computer program product for calibrating a depth sensor of a device. The method includes simultaneously capturing within a current scene: a red-green-blue (RGB) image by a RGB sensor of a device; and an infrared (IR) image by an IR sensor of the device. The method further includes concurrently capturing, via an IR sensor of the device, an uncalibrated depth image within the current scene. The method further includes calculating calibration data from the RGB image and the IR image and applying the calibration data to the uncalibrated depth image to generate a corrected depth image. The method further includes combining the RGB image and the corrected depth image to generate a RGB depth image. The method further includes, presenting the RGB depth image on an output device.

20 Claims, 6 Drawing Sheets

DYNAMICALLY CALIBRATING A DEPTH SENSOR

BACKGROUND

1. Technical Field

The present disclosure generally relates to devices having depth sensors and in particular to a method for calibrating depth sensors.

2. Description of the Related Art

Some modern entertainment devices, such as virtual reality and gaming devices, are equipped with Red Green Blue (RGB) cameras and depth sensors that are used to detect a depth of objects in a current scene. One common type of depth sensor is RGB depth (RGB-D) sensors. RGB-D sensors frequently include a structured light depth sensor, which comprises a structured light infrared (IR) projector and an IR receiver.

Calibration is required to achieve point-to-point correspondence between the RGB camera and the depth sensor. Calibration is typically preprogrammed into the entertainment devices at the factory using a known target and known geometry. The parameters, consisting of intrinsic and extrinsic parameters for each sensor, are written to an electrically erasable programmable read-only memory (EEPROM) or one-time programming (OTP) unit. However, any physical expansion and/or contraction of the entertainment device, including any flex, expansion, or contraction due to a drop or fall may would cause the device to generate inaccurate depth maps. In order to ensure point-to-point correspondence between the RGB camera and the depth sensor is maintained after any physical expansion and/or contraction of the entertainment device, a factory recalibration would be required. Factory recalibration of the RGB camera and the depth sensor may be expensive and/or time consuming. Additionally, any subsequent expansion and/or contraction of the entertainment device after a factory recalibration has been performed would necessitate another factory calibration.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, a system, and a computer program product for calibrating a depth sensor of a device. The method includes simultaneously capturing within a current scene: a red-green-blue (RGB) image by a RGB sensor of a device; and an infrared (IR) image by an IR sensor of the device. The method further includes concurrently capturing, via an IR sensor of the device, an uncalibrated depth image within the current scene. The method further includes calculating calibration data from the RGB image and the IR image and applying the calibration data to the uncalibrated depth image to generate a corrected depth image. The method further includes combining the RGB image and the corrected depth image to generate a RGB depth image. The method further includes, presenting the RGB depth image on an output device.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within the below described device 100 (FIG. 1) are not intended to be exhaustive, but rather are representative to highlight components that can be utilized to implement the present disclosure. Other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
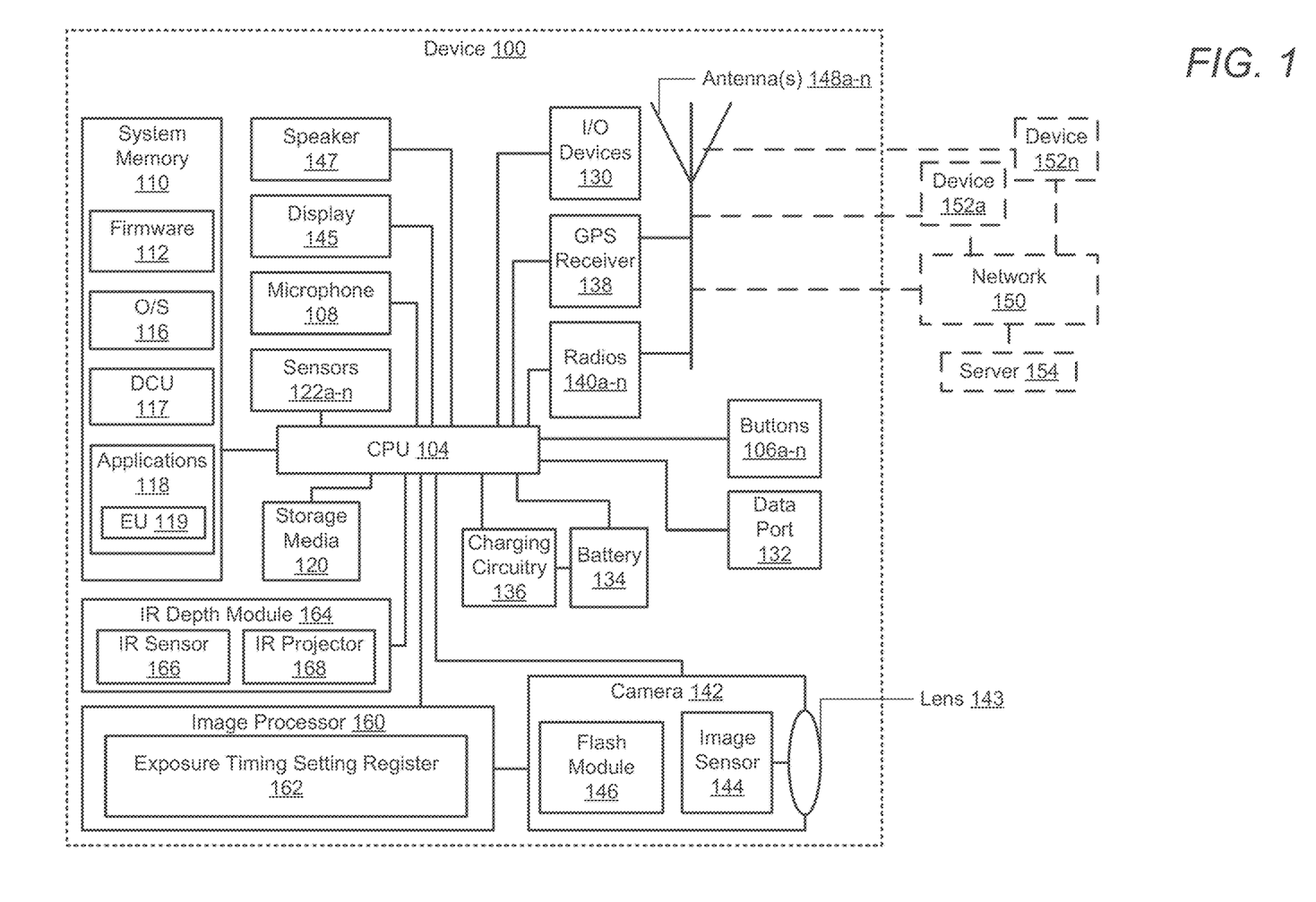
FIG. 1 illustrates an example device within which certain aspects of the disclosure can be practiced, in accordance with one or more embodiments.

Now turning to FIG. 1, there is illustrated an example device 100 within which one or more of the described features of the various embodiments of the disclosure can be implemented. In one embodiment, device 100 can be any electronic device that is equipped with at least one camera and a depth sensing module. For example, device 100 can include, but is not limited to, virtual reality headsets, entertainment devices, gaming peripherals, a desktop computer, a monitor, a notebook computer, a mobile/cellular phone, a mobile/cellular phone accessory, a digital camera, a video recorder, or a tablet computer. Device 100 includes central processing unit (CPU) 104. CPU 104 may contain a plurality of cores, each of which is capable of independent processing. In another embodiment, CPU 104 includes multiple CPUs. In another embodiment, CPU 104 may include a graphical processing unit (GPU), general purpose graphical processing unit (GPGPU), and/or digital signal processor (DSP). CPU 104 is coupled to storage media 120 and system memory 110, within which firmware 112, operating system (OS) 116, depth calibration utility (DCU) 117, and applications 118 can be stored for execution by CPU 104.

As shown, device 100 may include input devices and output devices (I/O devices 130) that enable a user to interface with device 100. In the illustrated embodiment, device 100 includes microphone 108, hardware buttons 106a-n, camera 142, and speaker 147. Device 100 may optionally include display 145. Microphone 108 may be used to receive spoken input/commands from a user. In other embodiments, microphone 108 includes multiple microphones. Hardware buttons 106a-n are selectable buttons which are used to receive manual/tactile input from a user to control specific operations of device 100 and/or of applications executing thereon. In one embodiment, hardware buttons 106a-n may also include, or may be connected to, one or more sensors (e.g. a fingerprint scanner) and/or may be pressure sensitive. Hardware buttons 106a-n may also be directly associated with one or more functions of a graphical user interface (not pictured) and/or functions of an OS, application, or hardware of device 100. In one embodiment, hardware buttons 106a-n may include a keyboard. Speaker 147 is used to output audio. In other embodiments, speaker 147 includes multiple speakers.

Camera 142 is utilized to capture images and/or video within a current environment of device 100. Camera 142 includes lens 143 for focusing light in a current scene onto image sensor 144, which converts the focused light to a digital representation (e.g., an image and/or video). In one or more embodiments, camera 142 includes a shutter (not illustrated) that is selectively opened in order to focus light to image sensor 144. Camera 142 may optionally include flash module 146 for illuminating a current scene with light during capture of images and/or video. In another embodiment, flash module 146 may be a standalone component of device 100. In one embodiment, camera 142 includes at least one color camera sensor (such as a red-green-blue (RGB) color sensor). Device 100 also includes image processor 160. Image processor 160 includes exposure timing setting register 162 which controls the timing of opening and closing of a shutter (not illustrated) of camera 142 in order to expose image sensor 144 to a desired amount of light. The shutter timing may be user-controlled, based on factory settings, and/or dynamically adjusted based on conditions in a current environment of device 100. Camera 142 and/or image processor 160 may also include an image compressor (not illustrated) that compresses, processes, and/or reformats images and/or video captured by camera 142 into a format that is suitable for viewing on display 145 or into a format that is used by one or more applications of device 100. Device 100 also includes infrared (IR) depth module 164. IR depth module 164 includes IR sensor 166 that captures IR images within a current scene. IR depth module 164 also includes IR projector 168 which projects an IR structured light image and/or pattern within a current scene. In one or more embodiments, the structured light image and/or pattern illuminates objects in the current scene. Distortions in the structured light image and/or pattern are captured by IR sensor 166.

CPU 104 is also coupled to sensors 122a-n and display 145. Sensors 122a-n can include, but are not limited to including, at least one of: motion sensors and/or accelerometers, proximity sensors, and/or additional cameras. Display 145 is capable of displaying text, media content, including images and video, and/or a graphical user interface (GUI) associated with or generated by firmware and/or one or more applications executing on device 100. In one embodiment, display 145 includes at least one internal display/monitor of device 100. In another embodiment, display 145 includes at least one external display, such as a remotely connected monitor, that is connected to device 100 via a wired and/or wireless connection. The GUI can be rendered by CPU 104 for viewing on display 145, in one embodiment, or can be rendered by a graphics processing unit (GPU) (not illustrated), in another embodiment. In one or more embodiments, display 145 is a touch screen that is also capable of receiving touch/tactile input from a user of device 100, such as when the user is interfacing with a displayed (or partially displayed) GUI. In at least one embodiment, device 100 can include a plurality of virtual buttons or affordances that operate in addition to, or in lieu of, hardware buttons 106*a-n*. For example, device 100 can be equipped with a touch screen interface and provide, via a GUI, a virtual keyboard or other virtual icons for user interfacing therewith.

According to one aspect, DCU 117 executes within device 100 to perform the various methods and functions described herein. In one or more embodiments, DCU 117 generates a RGB depth image (e.g., RGB depth image 216 of FIG. 2) based on color images captured by camera 142 and depth images captured/generated by IR depth module 164. In one embodiment, the generated RGB depth image may be presented/displayed on an output device (e.g., display 145) of device 100. In another embodiment, applications 118 include entertainment utility (EU) 119 that utilizes RGB depth images generated by DCU 117 to generate a graphical rendering/interface. For example, DCU 117 may utilize RGB depth images to render objects in a current scene of device 100 in a virtual environment. For simplicity, DCU 117 is illustrated and described as a stand-alone or separate software/firmware/logic component, which provides the specific functions and methods described below. However, in at least one embodiment, DCU 117 may be a component of, may be combined with, or may be incorporated within firmware 112, or OS 116, and/or within one or more of applications 118. For example, DCU 117 may be an added utility provided as an extension of and/or within EU 119.

Device 100 also includes data port 132 (e.g., a universal serial bus (USB) port), battery 134, and charging circuitry 136. Data port 132 can operate as a charging port that receives power via an external charging device (not pictured) for charging battery 134 via charging circuitry 136. Data port 132 can operate as a charging port that provides power to an external device that is connected to data port 132 for charging a battery (not pictured) of the external device via charging circuitry 136. Battery 134 may include a single battery or multiple batteries for providing power to components of device 100. In at least one embodiment, battery 134 includes at least one battery that is removable and/or replaceable by an end user. In another embodiment, battery 134 includes at least one battery that is permanently secured within/to device 100. Data port 132 may also function as one of an input port, an output port, and a combination input/output port.

Device 100 may also include global positioning satellite (GPS) receiver 138 and one or more wireless radios 140*a-n*. GPS 138 may be coupled to at least one of antenna(s) 148*a-n* to enable device 100 to determine its current location and/or rate of travel. Wireless radios 140*a-n* may also be coupled to one or more of antenna(s) 148*a-n* to enable device 100 to wirelessly connect to, and transmit and receive voice and/or data communication to/from, one or more other devices, such as devices 152*a-n* and server 154. As a wireless device, device 100 can transmit data over a wireless network 150 (e.g., a Wi-Fi network, cellular network, Bluetooth® network (including Bluetooth® low energy (BLE) networks), a wireless ad hoc network (WANET), or personal area network (PAN)). In one embodiment, device 100 may be further equipped with infrared (IR) device (not pictured) for communicating with other devices using an IR connection. In another embodiment, wireless radios 140*a-n* may include a short-range wireless device, including, but not limited to, a near field communication (NFC) device. In still another embodiment, device 100 may communicate with one or more other device(s) using a wired or wireless USB connection.

Figure 2:
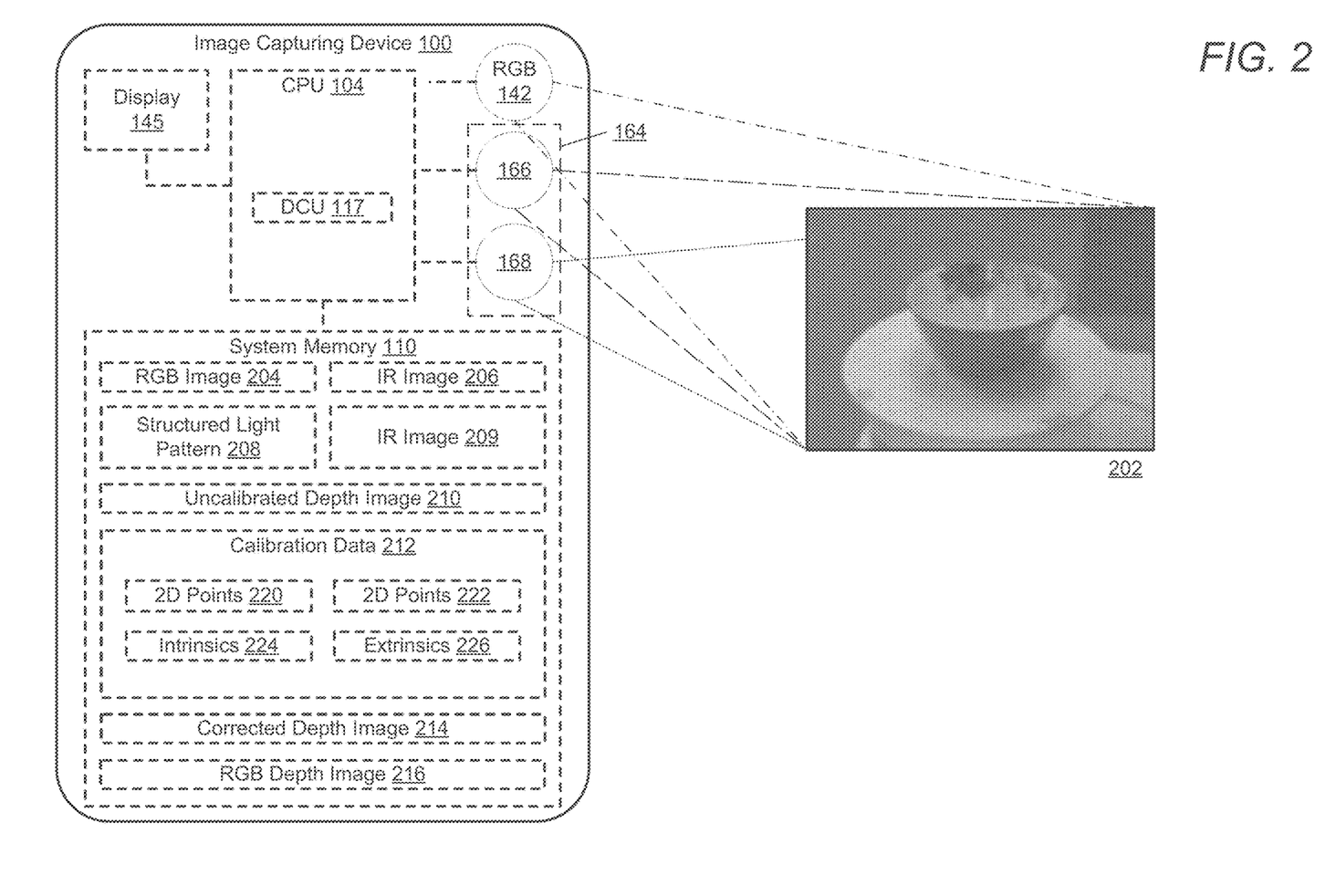
FIG. 2 illustrates an example device that generates a RGB depth image, in accordance with one or more embodiments.

FIG. 2 is a block diagram illustrating additional functional components within example device 100, in accordance with one or more embodiments of the present disclosure. As illustrated, device 100 includes CPU 104, which executes DCU 117. Device 100 also includes camera 142, IR depth module 164, display 145, and system memory 110. IR depth module 164 includes IR sensor 166 and IR projector 168. It should be noted that in other embodiments, device 100 may be configured with additional cameras and/or depth sensors. In one or more embodiments, camera 142 is utilized by CPU 104 to capture RGB image 204 in current scene 202. IR projector 168 is utilized to illuminate current scene 202 with structured light pattern 208. IR sensor 166 is utilized to (1) capture IR image 206 while current scene 202 is not illuminated with structured light pattern 208 and (2) capture IR image 209 while current scene 202 is illuminated with structured light pattern 208. In another embodiment, IR image 206 and IR image 209 may be captured by separate IR sensors. In one or more embodiments, CPU 104 generates uncalibrated depth image 210 based on structured light pattern 208 and IR image 209 and generates calibration data 212 from RGB image 204 and IR image 206. CPU 104 generates corrected depth image 214 by applying calibration data 212 to uncalibrated depth image 210. CPU 104 also generates RGB depth image 216 by combining/merging corrected depth image 214 and RGB image 204. RGB depth image 216 includes color information (RGB color information) and depth information in current scene 202. In one or more embodiments, display 145 is utilized to present RGB depth image 216 for viewing by a user of device 100.

Within current scene 202, device 100 captures RGB image 204 by RGB camera 142 and captures IR image 206 by IR sensor 166. RGB image 204 is an image containing color information (e.g., color information in the visible spectrum) for objects in current scene 202. In one embodiment, RGB image 204 is captured in an RGB color space. However, in other embodiments, RGB image 204 may be captured in another color space, such as the YCbCr color space. IR image 206 is an image that captures infrared light in the current scene. In one or more embodiments, RGB image 204 and IR image 206 are captured simultaneously.

Concurrently with the capture of RGB image 204 and IR image 206, device 100 illuminates current scene 202 with structured light pattern 208 emitted by IR projector 168. Structured light pattern 208 is a known pattern of infrared light. When emitted by IR projector 168, structured light pattern 208 illuminates objects within current scene 202. While current scene 202 is illuminated with structured light pattern 208, device 100 captures IR image 209 by IR sensor 166. IR image 209 is an image that captures infrared light, including structured light pattern 208, in the current scene. It should be noted that the capture of IR image 206 by IR sensor 166 occurs while current scene 202 is not illuminated by structured light pattern 208. That is, in one or more embodiments, the capture of IR image 209 does not occur simultaneously with the capture of RGB image 204 and IR image 206 but rather occurs substantially concurrently (i.e., within a relatively small amount of time before or after). For example, device 100 (1) simultaneously captures RGB image 204 and IR image 206 and (2) subsequently projects structured light pattern 208 by IR projector 168 and concurrently captures IR image 209 while current scene 202 is illuminated by structured light pattern 208. In another embodiment, IR image 209 may be captured by IR sensor 166 prior to the simultaneous capture of RGB image 204 and IR image 206. IR depth module 164 analyzes IR image 209 based on the known pattern of structured light pattern 208 to identify distortions in the known pattern within current scene 202. Based on distortions in structured light pattern 208 within IR image 209, IR depth module 164 determines a depth of a plurality of points and/or objects within current scene 202. In response to analyzing IR image 209 based on the known pattern of structured light pattern 208, IR depth module 164 generates an output including uncalibrated depth image 210. Uncalibrated depth image 210 provides a depth mapping of objects in current scene 202 at the moment of capture of IR image 209. In another embodiment, the analysis of structured light pattern 208 within IR image 209 and the generation of uncalibrated depth image 210 is performed by CPU 104.

CPU 104 also generates calibration data 212, which establishes a correspondence between a plurality of points within RGB image 204 and IR image 206. Calibration data 212 can be used to rectify uncalibrated depth image 210 to generate corrected depth image 214. To generate calibration data 212, CPU 104 analyzes RGB image 204 to identify a set of two-dimensional (2D) points (e.g., 2D points 220) within RGB image 204. CPU 104 also analyzes IR image 206 to identify a set of two-dimensional points (e.g., 2D points 222) within IR image 206 which correspond to 2D points 220. For each corresponding pair of points between 2D points 220 and 2D points 222, CPU 104 determines a two-dimensional difference in location between RGB image 204 and IR image 206. CPU 104 calculates calibration data 212 based on the two-dimensional differences in location of each corresponding two-dimensional point between RGB image 204 and IR image 206. In one or more embodiments, calibration data 212 is stored within memory (e.g., system memory 110) of device 100.

Figure 3:
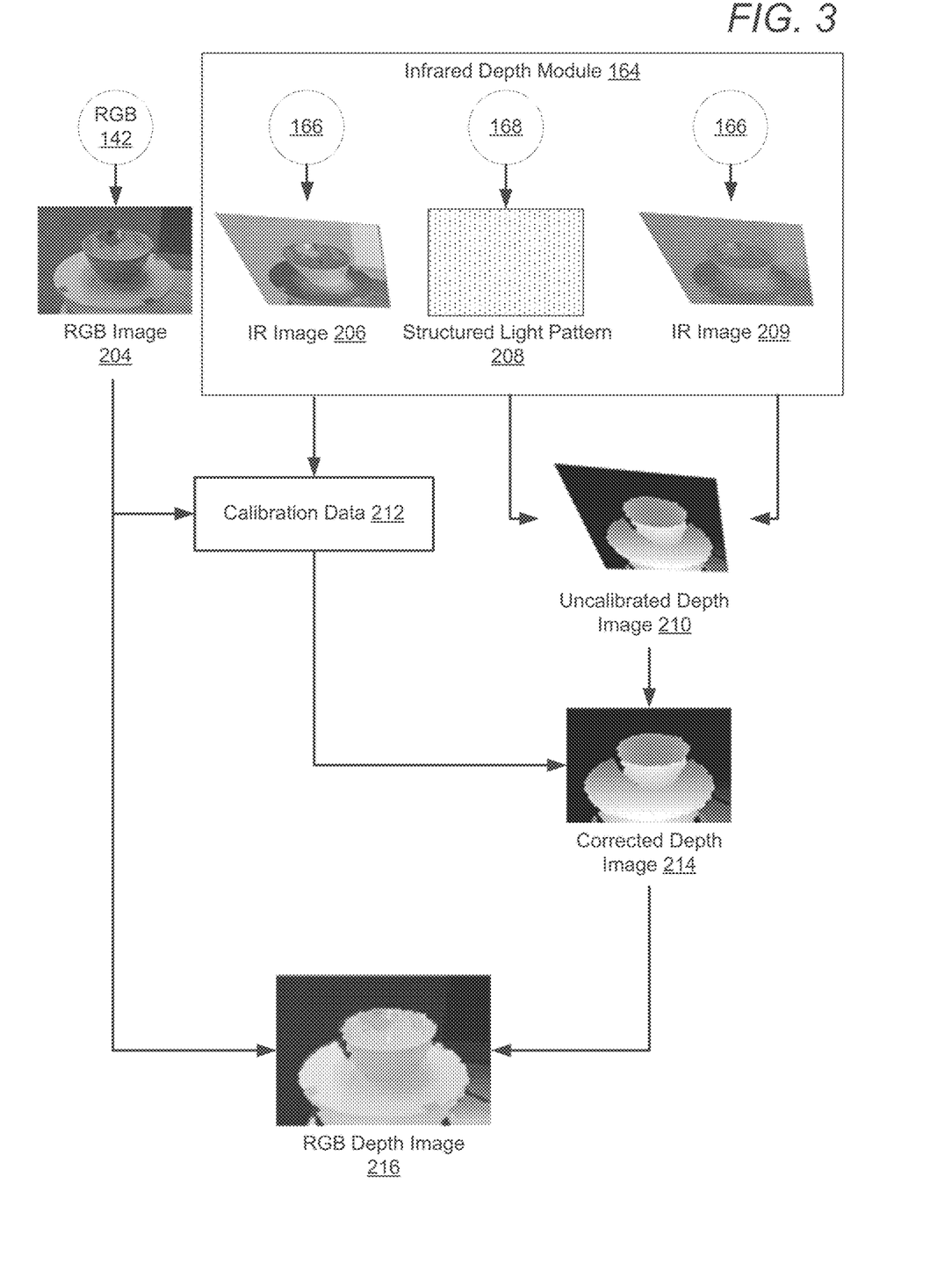
FIG. 3 is a flow diagram that depicts the generation of the RGB depth image, in accordance with one or more embodiments.

CPU 104 applies calibration data 212 to the uncalibrated depth image 210 to generate corrected depth image 214. Corrected depth image 214 is a calibrated and rectified depth image that matches a perspective/alignment of RGB image 204 and which illustrates a depth mapping of objects in current scene 202. FIG. 3 is a flow diagram that depicts the generation of the RGB depth image. As shown in FIG. 3, uncalibrated depth image 210 is distorted while RGB image 204 is properly aligned/oriented. In response to applying calibration data 212 to uncalibrated depth image 212, CPU 104 generates corrected depth image 214, which is in a proper alignment/orientation that matches the alignment/orientation of RGB image 204.

CPU 104 generates RGB depth image 216 by combining and/or merging RGB image 204 and corrected depth image 214. RGB depth image 216 depicts color and depth of objects in current scene 202. As shown in FIG. 3, RGB depth image 216 shows both color detail and depth of the depicted cup and plate while also providing depth of objects in current scene 202. Referring again to FIG. 2, in one or more embodiments, RGB depth image 216 can be viewed on an output device of device 100, such as display 145 and/or stored within memory (e.g., system memory 110).

CPU 104 further analyzes uncalibrated depth image 210 to identify a depth within the current scene for each of 2D points 222. In one embodiment, CPU 104 performs at least one of a linear regression and a non-linear regression using 2D points 220, 2D points 222, and the identified depth of 2D points 222. CPU 104 further determines a set of camera intrinsics (e.g., camera intrinsics 224) and a set of camera extrinsics (e.g., camera extrinsics 226) from the result of the linear/non-linear regression. Camera intrinsics 224 identify a focal length, lens distortion parameters, and/or optical center of camera 142 and/or IR sensor 166. Camera extrinsics 226 identify a three-dimensional location and/or direction of camera 142 and/or IR sensor 166 in current scene 202 and/or the transformation of light entering camera 142 and/or IR sensor 166 from the current scene 202. In one or more embodiments, CPU 104 performs a linear optimization and/or non-linear optimization to solve an intrinsic matrix and extrinsic matrix. For example, CPU 104 calculates the intrinsic and extrinsic values using the below equations in which s is the scaling factor, the x and y values are 2D points 220, X and Y values are 2D points 222, and Z values are the identified depth of 2D points 222

$$\begin{bmatrix} x \times s \\ y \times s \\ s \end{bmatrix} = I \times E \times \begin{bmatrix} X \\ Y \\ Z \\ 1 \end{bmatrix} \quad \text{Optimization Formula}$$

$$E = \begin{bmatrix} R_{11} & R_{12} & R_{13} & \vdots & t_1 \\ R_{21} & R_{22} & R_{23} & \vdots & t_2 \\ R_{31} & R_{32} & R_{33} & \vdots & t_3 \end{bmatrix} \quad \text{Extrinsic Matrix}$$

$$I = \begin{bmatrix} f_x & 0 & c_x \\ 0 & f_y & c_y \\ 0 & 0 & 1 \end{bmatrix} \quad \text{Intrinsic matrix}$$

CPU 104 may further account for lens distortion by using a lens model, such as the Brown Polynomial Model depicted below.

$$\begin{bmatrix} \tilde{x} \\ \tilde{y} \end{bmatrix} = f\left(\begin{bmatrix} \tilde{x} \\ \tilde{y} \end{bmatrix}\right) \quad \text{Brown Polynomial Model}$$

$$\begin{bmatrix} x \times s \\ y \times s \\ s \end{bmatrix} = I \times \begin{bmatrix} \tilde{x} \\ \tilde{y} \\ 1 \end{bmatrix}$$

In one or more embodiments, while applying calibration data 212 to the uncalibrated depth image 210, CPU 104 further transforms uncalibrated depth image 210 based on camera intrinsics 224 and camera extrinsics 226 to generate corrected depth image 214. In those embodiments, corrected depth image 214 is a depth image that (1) is transformed based on camera intrinsics 224 (e.g., lens distortion parameters) and camera extrinsics 226 of camera 142 and/or IR sensor 166 and (2) is rectified to an alignment/orientation that matches the alignment/orientation of RGB image 204.

Figure 4:
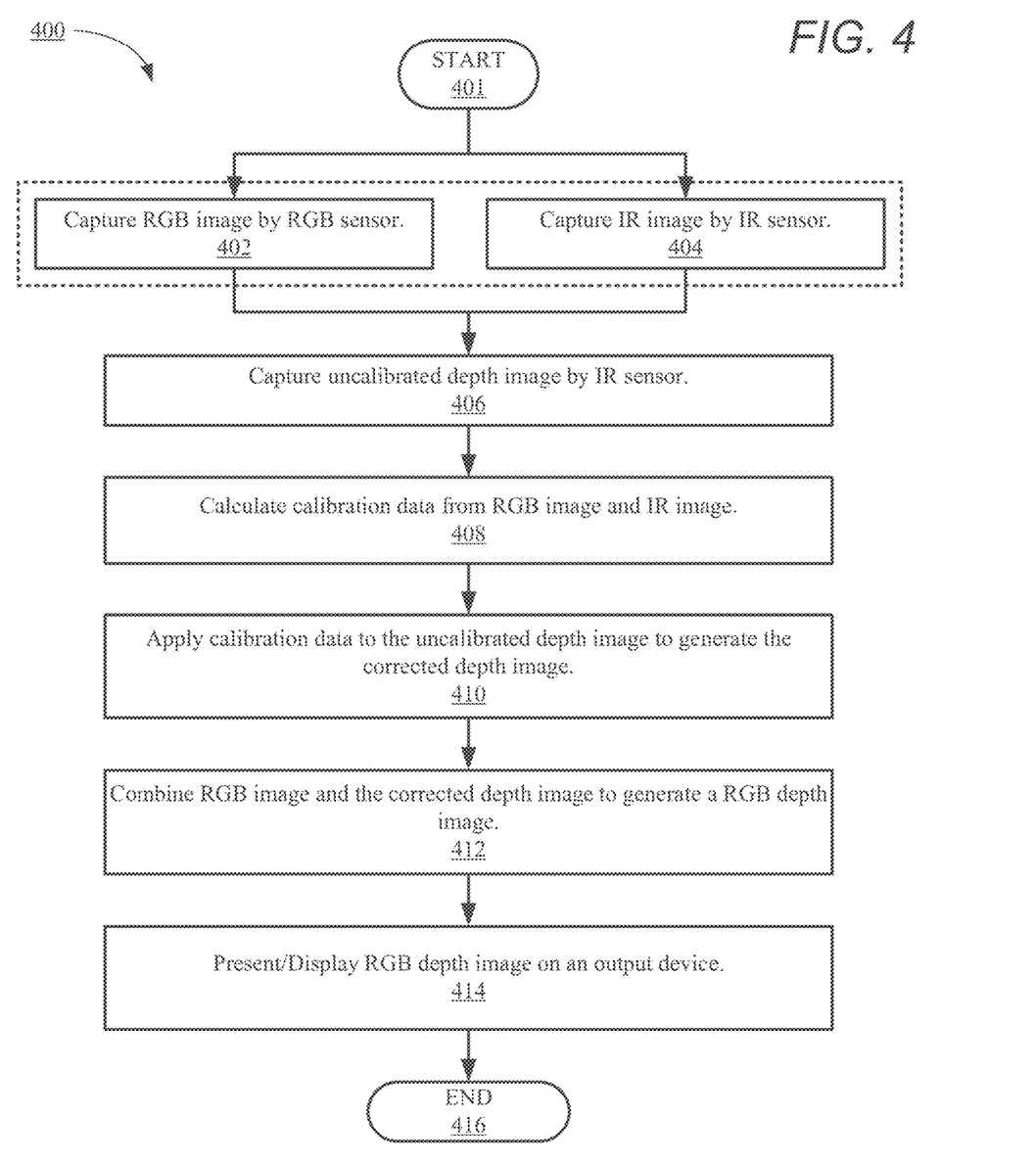
FIG. 4 is a flow chart illustrating a method for generating a RGB depth image, in accordance with one or more embodiments.
Figure 5:
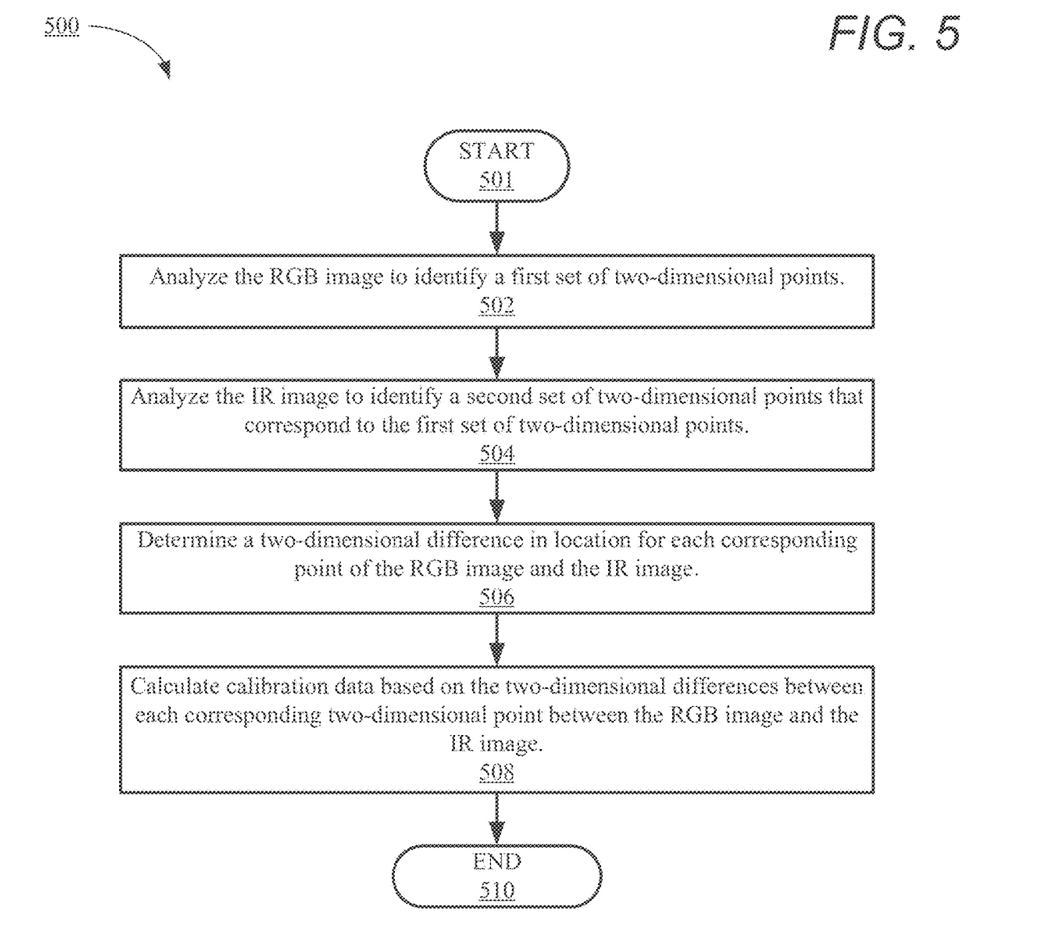
FIG. 5 is a flow chart illustrating a method for calculating calibration data from a RGB image and an IR image, in accordance with one or more embodiments.
Figure 6:
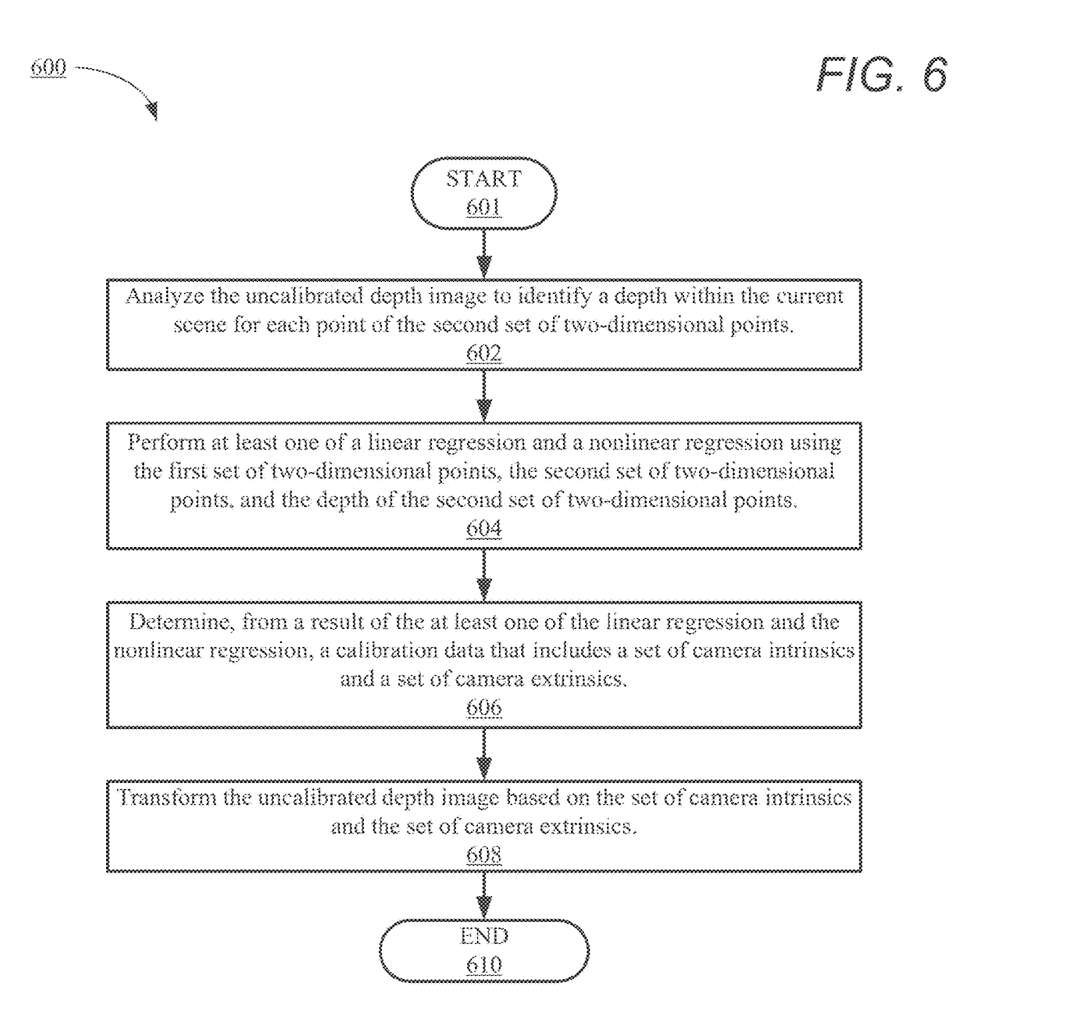
FIG. 6 is a flow chart illustrating a method for generating a corrected depth image, in accordance with one or more embodiments.

Referring now to FIGS. 4-6, aspects of the methods are described with reference to the components of FIGS. 1-2. Several of the processes of the methods provided in FIGS. 4-6 can be implemented by a processor (e.g., CPU 104) executing software code (i.e., program instructions) of DCU 117 within a device (e.g., device 100). The method processes described in FIGS. 4-6 are generally described as being performed by components of device 100.

Referring now to FIG. 4, there is depicted a flow chart illustrating a method for generating a RGB depth image, in accordance with one or more embodiments of the present disclosure. Method 400 commences at initiator block 401 then proceeds to block 402. At block 402, CPU 104 captures, by an RGB camera (e.g., camera 142) of device 100, a RGB image (e.g., RGB image 204) that depicts color detail for objects in a current scene (e.g., current scene 202). At block 404, CPU 104 simultaneously captures, by an IR sensor (e.g., IR sensor 166) of device 100, an IR image (e.g., IR image 206) that depicts infrared light in the current scene. At block 406, the IR sensor captures an uncalibrated depth image (e.g., uncalibrated depth image 210) which provides a depth mapping of objects in current scene 202. At block 408, CPU 104 calculates calibration data (e.g., calibration data 212) from the RGB image and the IR image. At block 410, CPU 104 applies the calibration data to the uncalibrated depth image to generate a corrected depth image (e.g. corrected depth image 214). At block 412, CPU 104 combines/merges the RGB image and the corrected depth image to generate a RGB depth image (e.g., RGB depth image 216) that includes color detail and depth of objects in the current scene. At block 414, CPU 104 presents RGB depth image 216 on an output device (e.g., display 145) Method 400 then ends at block 416.

Referring now to FIG. 5, there is depicted a flow chart illustrating a method for calculating calibration data from a RGB image and an IR image, in accordance with one or more embodiments of the present disclosure. In one or more embodiments, the features and/or functionality provided by method 500 may be performed at step 408 of method 400 (as described in FIG. 4, above). Method 500 commences at initiator block 501 then proceeds to block 502. At block 502, CPU 104 analyzes the RGB image (e.g., RGB image 204) to identify a first set of two-dimensional points (e.g., 2D points 220). At block 504, CPU 104 analyzes the IR image (e.g., IR image 206) to identify a second set of two-dimensional points (e.g., 2D points 222) within the IR image which correspond to the identified 2D points of the RGB image. At block 506, CPU 104 determines a two-dimensional difference in location between corresponding points between the RGB image and the IR image. At block 508, CPU 104 calculates, based on the two-dimensional differences in location for each corresponding point, a calibration data (e.g., calibration data 212) that may be applied to an uncalibrated depth image (e.g., uncalibrated depth image 210) to rectify the uncalibrated depth image to an alignment/orientation that matches that of the RGB image. Method 500 then ends at block 510.

Referring now to FIG. 6, there is depicted a flow chart illustrating a method for generating a corrected depth image, in accordance with one or more embodiments of the present disclosure. In one or more embodiments, the features and/or functionality provided by method 600 may be performed at steps 408-410 of method 400 (as described in FIG. 4, above). Method 600 commences at initiator block 601 then proceeds to block 602. At block 602, CPU 104 analyzes the uncalibrated depth image (e.g., uncalibrated depth image 210) to identify a depth within a current scene (e.g., current scene 202) for each point of the two-dimensional points (e.g., 2D points 222) within the IR image (IR image 206). At block 604, CPU 104 performs at least one of a linear regression and a non-linear regression using the first set of two-dimensional points (e.g., 2D points 220), the second set of two-dimensional points (e.g., 2D points 222), and the depth of the second set of two-dimensional points. At block 606, CPU 104 analyzes a result of the at least one of a linear regression and a non-linear regression to determine calibration data (e.g., calibration data 212) that includes a set of camera intrinsics (e.g., intrinsics 224) and a set of camera extrinsics (e.g., extrinsics 226). At block 608, CPU 104 transforms the uncalibrated depth image into the corrected depth image (e.g. corrected depth image 214) based on the determined camera intrinsics and camera extrinsics. Method 600 then ends at block 610.

In the above-described flow charts of FIG. 4-6, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method comprising:
    simultaneously capturing within a current scene:
        a red-green-blue (RGB) image by a RGB sensor of a device; and
        an infrared (IR) image by an IR sensor of the device;
    concurrently capturing, via the IR sensor, an uncalibrated depth image within the current scene;
    calculating calibration data from the RGB image and the IR image;
    applying the calibration data to the uncalibrated depth image to generate a corrected depth image;
    combining the RGB image and the corrected depth image to generate a RGB depth image; and
    presenting the RGB depth image on a display of the device.

2. The method of claim 1, wherein capturing the uncalibrated depth image further comprises:
    projecting, by a structured light emitter of the device, a structured light pattern within the current scene;
    wherein the uncalibrated depth image is captured while the current scene is illuminated with the structured light pattern.

3. The method of claim 1, wherein applying the calibration data to the uncalibrated depth image further comprises rectifying the uncalibrated depth image based on the calibration data to generate the corrected depth image.

4. The method of claim 1, wherein calculating the calibration data further comprises:
    analyzing the RGB image to identify a first set of two-dimensional points;
    analyzing the IR image to identify a second set of two-dimensional points that correspond to the first set of two-dimensional points;
    determining, for each corresponding two-dimensional point, a two-dimensional difference in location between the RGB image and the IR image; and
    calculating the calibration data based on the two-dimensional differences of each corresponding two-dimensional point between the RGB image and the IR image.

5. The method of claim 4, wherein calculating the calibration data further comprises:
    analyzing the uncalibrated depth image to identify a depth within the current scene for each point of the second set of two-dimensional points; and
    performing at least one of a linear regression and a nonlinear regression using the first set of two-dimensional points, the second set of two-dimensional points, and the depth of the second set of two-dimensional points.

6. The method of claim 5, further comprising:
    determining, from a result of the at least one of the linear regression and the nonlinear regression, a set of camera intrinsics and a set of camera extrinsics;
    wherein applying the calibration data to the uncalibrated depth image further comprises transforming the uncalibrated depth image based on the set of camera intrinsics and the set of camera extrinsics.

7. The method of claim 5, further comprising:
    determining lens distortion parameters from a result of the at least one of the linear regression and the nonlinear regression; and
    wherein applying the calibration data to the uncalibrated depth image further comprises transforming the uncalibrated depth image based on the lens distortion parameters.

8. A device comprising:
    a memory;
    a red-green-blue (RGB) sensor that captures a RGB image within a current scene;
    an infrared (IR) sensor that simultaneously captures an IR image within the current scene and that concurrently captures an uncalibrated depth image within the current scene;
    at least one processor that:
        calculates calibration data from the RGB image and the IR image;
        applies the calibration data to the uncalibrated depth image to generate a corrected depth image; and
        combines the RGB image and the corrected depth image to generate a RGB depth image; and
    at least one display that presents the RGB depth image.

9. The device of claim 8, further comprising:
    a structured light emitter that projects a structured light pattern within the current scene;

wherein in capturing the uncalibrated depth image, the IR sensor captures the uncalibrated depth image while the current scene is illuminated with the structured light pattern.

10. The device of claim 8, wherein in applying the calibration data to the uncalibrated depth image, the at least one processor rectifies the uncalibrated depth image based on the calibration data to generate the corrected depth image.

11. The device of claim 8, wherein in calculating the calibration data, the at least one processor:
   analyzes the RGB image to identify a first set of two-dimensional points;
   analyzes the IR image to identify a second set of two-dimensional points that correspond to the first set of two-dimensional points;
   determines, for each corresponding two-dimensional point, a two-dimensional difference in location between the RGB image and the IR image; and
   calculates the calibration data based on the two-dimensional differences of each corresponding two-dimensional point between the RGB image and the IR image.

12. The device of claim 11, wherein in calculating the calibration data, the at least one processor:
   analyzes the uncalibrated depth image to identify a depth within the current scene for each point of the second set of two-dimensional points; and
   performs at least one of a linear regression and a nonlinear regression using the first set of two-dimensional points, the second set of two-dimensional points, and the depth of the second set of two-dimensional points.

13. The device of claim 12, wherein:
   the at least one processor determines, from a result of the at least one of the linear regression and the nonlinear regression, a set of camera intrinsics and a set of camera extrinsics; and
   in applying the calibration data to the uncalibrated depth image, the at least one processor transforms the uncalibrated depth image based on the set of camera intrinsics and the set of camera extrinsics.

14. The device of claim 12, wherein:
   the at least one processor determines lens distortion parameters from a result of the at least one of the linear regression and the nonlinear regression; and
   in applying the calibration data to the uncalibrated depth image, the at least one processor transforms the uncalibrated depth image based on the lens distortion parameters.

15. A computer program product comprising:
   a non-transitory computer readable storage device; and
   program code on the computer readable storage device that, when executed by a processor associated with a device, enables the device to provide the functionality of:
   simultaneously capturing within a current scene:
      a red-green-blue (RGB) image by a RGB sensor of a device; and
      an infrared (IR) image by an IR sensor of the device;
   concurrently capturing, via the IR sensor, an uncalibrated depth image within the current scene;
   calculating calibration data from the RGB image and the IR image;
   applying the calibration data to the uncalibrated depth image to generate a corrected depth image;
   combining the RGB image and the corrected depth image to generate a RGB depth image; and
   presenting the RGB depth image on a display of the device.

16. The computer program product of claim 15, the program code for calculating the calibration data further comprising code for:
   analyzing the RGB image to identify a first set of two-dimensional points;
   analyzing the IR image to identify a second set of two-dimensional points that correspond to the first set of two-dimensional points;
   determining, for each corresponding two-dimensional point, a two-dimensional difference in location between the RGB image and the IR image; and
   calculating the calibration data based on the two-dimensional differences of each corresponding two-dimensional point between the RGB image and the IR image.

17. The computer program product of claim 16, the program code for calculating the calibration data further comprising code for:
   analyzing the uncalibrated depth image to identify a depth within the current scene for each point of the second set of two-dimensional points; and
   performing at least one of a linear regression and a nonlinear regression using the first set of two-dimensional points, the second set of two-dimensional points, and the depth of the second set of two-dimensional points.

18. The computer program product of claim 17, the program code further comprising code for:
   determining, from a result of the at least one of the linear regression and the nonlinear regression, a set of camera intrinsics and a set of camera extrinsics;
   wherein applying the calibration data to the uncalibrated depth image further comprises transforming the uncalibrated depth image based on the set of camera intrinsics and the set of camera extrinsics.

19. The computer program product of claim 17, the program code further comprising code for:
   determining lens distortion parameters from a result of the at least one of the linear regression and the nonlinear regression; and
   wherein applying the calibration data to the uncalibrated depth image further comprises transforming the uncalibrated depth image based on the lens distortion parameters.

20. The computer program product of claim 15, wherein:
   the program code for capturing the uncalibrated depth image further comprises code for projecting, by a structured light emitter of the device, a structured light pattern within the current scene, wherein the uncalibrated depth image is captured while the current scene is illuminated with the structured light pattern; and
   the program code for applying the calibration data to the uncalibrated depth image further comprise code for rectifying the uncalibrated depth image based on the calibration data to generate the corrected depth image.

* * * * *